United States Patent
Ogawa et al.

(10) Patent No.: US 10,868,316 B2
(45) Date of Patent: Dec. 15, 2020

(54) FUEL CELL SYSTEM AND METHOD OF CONTROLLING THE SAME

(71) Applicant: TOYOTA JIDOSHA KABUSHIKI KAISHA, Toyota (JP)

(72) Inventors: Tomohiro Ogawa, Miyoshi (JP); Tomotaka Ishikawa, Nagoya (JP); Tomio Yamanaka, Nagoya (JP); Ryoichi Nanba, Okazaki (JP); Kenji Umayahara, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 202 days.

(21) Appl. No.: 16/238,906

(22) Filed: Jan. 3, 2019

(65) Prior Publication Data

US 2019/0260045 A1  Aug. 22, 2019

(30) Foreign Application Priority Data

Feb. 20, 2018  (JP) ................................. 2018-028106

(51) Int. Cl.
*H01M 8/04* (2016.01)
*H01M 8/04119* (2016.01)
*H01M 8/04828* (2016.01)
*H01M 8/04492* (2016.01)

(52) U.S. Cl.
CPC ... *H01M 8/04179* (2013.01); *H01M 8/04522* (2013.01); *H01M 8/04843* (2013.01); *H01M 2250/20* (2013.01)

(58) Field of Classification Search
CPC ......... H01M 8/04179; H01M 8/04291; H01M 8/04507; H01M 8/04522; H01M 8/04753; H01M 8/04843; H01M 2250/20
See application file for complete search history.

(56) References Cited

U.S. PATENT DOCUMENTS

2015/0125767 A1   5/2015  Wake et al.

FOREIGN PATENT DOCUMENTS

JP   2013-239290 A   11/2013
JP   2015-090779 A   5/2015

*Primary Examiner* — Brittany L Raymond
(74) *Attorney, Agent, or Firm* — Oliff PLC (57) ABSTRACT

When the fuel cell stack is operated in a state in which the air stoichiometric ratio is smaller than the predetermined value, the controller calculates the amount of retained water that has been retained in the cathode flow path of the fuel battery cell per fixed time in such a way that the calculated amount includes an extra amount therein, integrates the amount of retained water per fixed time that has been calculated in such a way that the calculated amount includes the extra amount therein, and executes air blow in the cathode flow path of the fuel battery cell when the integrated value of the amount of retained water becomes equal to or larger than the threshold.

4 Claims, 8 Drawing Sheets

WHEN NORMAL OPERATION IS PERFORMED

FUEL CELL SYSTEM AND METHOD OF CONTROLLING THE SAME

CROSS REFERENCE TO RELATED APPLICATIONS

This application is based upon and claims the benefit of priority from Japanese patent application No. 2018-028106, filed on Feb. 20, 2018, the disclosure of which is incorporated herein in its entirety by reference.

BACKGROUND

The present disclosure relates to a fuel cell system and a method of controlling the same.

Fuel cell (FC) systems incorporated in a vehicle have been put to practical use. The fuel cell system includes a fuel cell stack. The fuel cell stack has a structure in which a plurality of fuel battery cells are stacked.

In a fuel battery cell, an anode catalyst layer and an anode gas diffusion layer are stacked in this order on a surface of an electrolyte film on an anode side, and an anode flow path is formed on the outside of the anode gas diffusion layer. Further, in the fuel battery cell, a cathode catalyst layer and a cathode gas diffusion layer are stacked in this order on a surface of the electrolyte film on a cathode side, and a cathode flow path is formed on the outside of the cathode gas diffusion layer. The gas diffusion layer is also referred to as a GDL.

The fuel battery cell generates power by a reaction of hydrogen supplied from the anode flow path to the anode catalyst layer via the anode gas diffusion layer as hydrogen gas with oxygen supplied from the cathode flow path to the cathode catalyst layer via the cathode gas diffusion layer as air (air including oxygen) via an electrolyte film.

In this case, water, which is a reaction product, is generated in the electrolyte film, this water overflows and is retained in the cathode flow path, and becomes retained water. When this retained water contacts the electrolyte film, it is contaminated with a foreign matter (Si) generated from the fuel battery cell, and thus stretchability of the electrolyte film is hindered, which causes the fuel battery cell to be degraded.

In order to solve the aforementioned problem, in recent years, techniques for reducing the retained water that is retained in the cathode flow path have been proposed. For example, Japanese Unexamined Patent Application Publication No. 2013-239290 discloses a technique of estimating the amount of retained water that is retained in the cathode flow path, and when the amount of retained water that has been estimated becomes equal to or larger than a threshold, increasing the air flow rate in the cathode flow path and executing air blow.

SUMMARY

Incidentally, the fuel cell stack may be operated in a state in which the air stoichiometric ratio of the air to be supplied to the fuel cell stack is lower than a predetermined value. The inventors have newly found that, when the fuel cell stack is operated at a low air stoichiometric ratio, power generation is locally concentrated in a site of the cell surface of the fuel battery cell, and the amount of water retained in this site is locally increased.

However, even when the amount of retained water is locally increased in the cell surface of the fuel battery cell, since the amount of retained water on the entire cell surface is small, in the technique disclosed in Japanese Unexamined Patent Application Publication No. 2013-239290, it is possible that air blow may not be executed, which causes the retained water at the site where the amount of retained water increases to contact the electrolyte film, resulting in degradation in the fuel battery cell.

Therefore, a technique capable of appropriately executing the air blow and preventing degradation of the fuel battery cell even under a condition in which the fuel cell stack is operated at a low air stoichiometric ratio, that is, a condition in which the local increase in the amount of retained water occurs in the cell surface of the fuel battery cell, has been desired.

The present disclosure has been made in view of the aforementioned problems and provides a fuel cell system and a method of controlling the same capable of preventing degradation of the fuel battery cell even under a condition in which the local increase in the amount of retained water occurs in the cell surface of the fuel battery cell.

A fuel cell system according to one aspect of the present disclosure includes:

a fuel cell stack formed of a plurality of stacked fuel battery cells;

an air supply apparatus configured to supply air to a cathode flow path of the fuel battery cell; and a controller configured to control supply of the air by the air supply apparatus, in which when the fuel cell stack is operated in a state in which an air stoichiometric ratio of the air to be supplied to the cathode flow path of the fuel battery cell is equal to or larger than a predetermined value, the controller calculates an amount of retained water that has been retained in the cathode flow path of the fuel battery cell per fixed time, integrates the amount of retained water per fixed time that has been calculated, and executes air blow in the cathode flow path of the fuel battery cell when the integrated value of the amount of retained water becomes equal to or larger than a threshold, and when the fuel cell stack is operated in a state in which the air stoichiometric ratio is smaller than the predetermined value, the controller calculates the amount of retained water that has been retained in the cathode flow path of the fuel battery cell per fixed time in such a way that the calculated amount includes an extra amount therein, integrates the amount of retained water per fixed time that has been calculated in such a way that the calculated amount includes the extra amount therein, and executes air blow in the cathode flow path of the fuel battery cell when the integrated value of the amount of retained water becomes equal to or larger than the threshold.

A method of controlling a fuel cell system according to one aspect of the present disclosure is a method of controlling a fuel cell system including a fuel cell stack formed of a plurality of stacked fuel battery cells, in which when the fuel cell stack is operated in a state in which an air stoichiometric ratio of air to be supplied to a cathode flow path of the fuel battery cell is equal to or larger than a predetermined value, an amount of retained water that has been retained in the cathode flow path of the fuel battery cell per fixed time is calculated, the amount of retained water per fixed time that has been calculated is integrated, and air blow in the cathode flow path of the fuel battery cell is executed when the integrated value of the amount of retained water becomes equal to or larger than a threshold, and when the fuel cell stack is operated in a state in which the air stoichiometric ratio is smaller than the predetermined value, the amount of retained water that has been retained in the cathode flow path of the fuel battery cell per fixed time is calculated in such a way that the calculated amount includes an extra amount therein, the amount of retained water per fixed time that has been calculated in such a way that the calculated amount includes the extra amount therein is integrated, and air blow in the cathode flow path of the fuel battery cell is executed when the integrated value of the amount of retained water becomes equal to or larger than the threshold.

According to the aforementioned aspects of the present disclosure, it is possible to provide a fuel cell system and a method of controlling the same capable of preventing degradation of the fuel battery cell even under a condition in which the fuel cell stack is operated at a low air stoichiometric ratio, that is, a condition in which the local increase in the amount of retained water occurs in the cell surface of the fuel battery cell.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, with reference to the drawings, embodiments of the present disclosure will be explained. Throughout the drawings explained in the following description, the same or corresponding elements are denoted by the same reference symbols and overlapping descriptions will be omitted as appropriate. Further, specific numerical values and the like stated in the following embodiments are merely examples for facilitating understanding of the present disclosure, and are not limited thereto.

(1) First Embodiment

Figure 1:
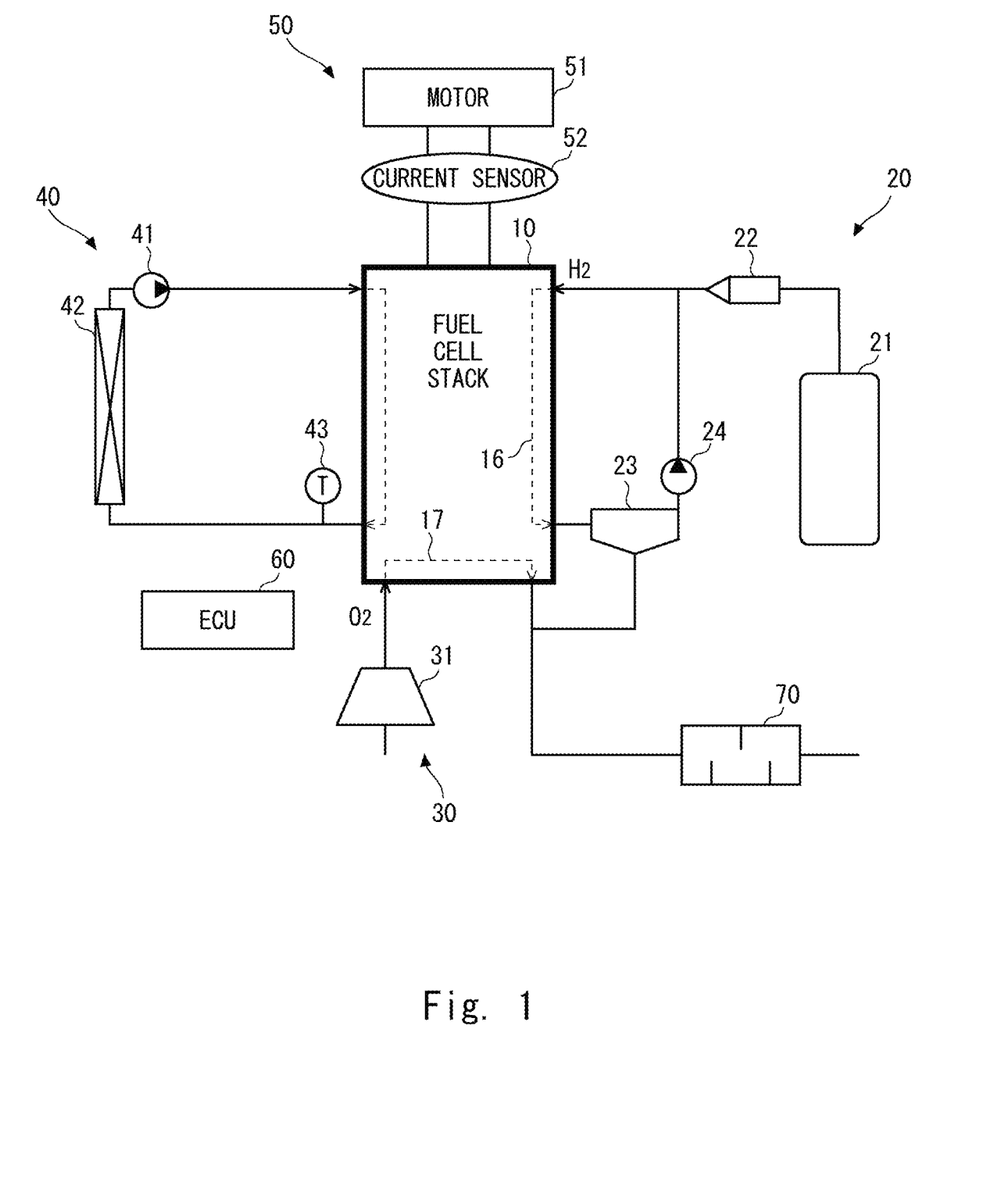
FIG. 1 is a view showing a configuration example of a fuel cell system according to a first embodiment.

FIG. 1 shows a configuration example of a fuel cell system according to a first embodiment. The fuel cell system according to the first embodiment is mounted on a fuel cell hybrid vehicle (FCHV), an electric automobile, a hybrid automobile or the like and is used.

Referring to FIG. 1, the fuel cell system according to the first embodiment includes a fuel cell stack 10, a hydrogen system 20 that supplies hydrogen gas to an anode flow path 16 of the fuel cell stack 10, an air system 30 that supplies air (air including oxygen) to a cathode flow path 17 of the fuel cell stack 10, a cooling medium system 40 that cools the fuel cell stack 10, and a power consumption system 50 that consumes power generated in the fuel cell stack 10, an Electric Control Unit (ECU) 60 that controls these elements, and a muffler 70. FIG. 1 shows only the main components of the fuel cell system in a selective manner in order to prevent the drawing from being complicated, and connection lines between the ECU 60 and the other elements are not shown.

The fuel cell stack 10 has a structure in which a plurality of fuel battery cells 11 (see FIG. 2) are stacked. The fuel battery cell 11 generates power by an oxidation-reduction reaction of hydrogen supplied from the hydrogen system 20 to the anode flow path 16 as hydrogen gas with oxygen supplied from the air system 30 to the cathode flow path 17 as air. The detailed structure of the fuel battery cell 11 will be explained later with reference to FIG. 2.

The hydrogen system 20 includes a high pressure hydrogen tank 21, an injector 22, a gas-liquid separator 23, and a hydrogen pump 24.

The high pressure hydrogen tank 21 stores high-pressure hydrogen gas.

The injector 22 supplies the hydrogen gas stored in the high pressure hydrogen tank 21 to the anode flow path 16 of the fuel cell stack 10.

The gas-liquid separator 23 separates water from unreacted hydrogen gas discharged from the anode flow path 16 of the fuel cell stack 10. The water separated from the unreacted hydrogen gas is temporarily stored in the gas-liquid separator 23, and after that this water is discharged outside the car through the muffler 70 along with unreacted air discharged from the cathode flow path 17 of the fuel cell stack 10.

The hydrogen pump 24 supplies the hydrogen gas separated in the gas-liquid separator 23 to the anode flow path 16 of the fuel cell stack 10 again along with the hydrogen gas supplied from the injector 22.

The air system 30 includes an air compressor 31.

The air compressor 31 is an air supply apparatus configured to suck air from outside the vehicle and supply the sucked air to the cathode flow path 17 of the fuel cell stack 10.

The cooling medium system 40 includes a water pump 41, a radiator 42, and a water temperature sensor 43.

The water pump 41 circulates the cooling medium between the fuel cell stack 10 and the radiator 42.

The radiator 42 radiates heat of the cooling medium discharged from the fuel cell stack 10 and thus cools the cooling medium.

The water temperature sensor 43 detects the water temperature of the cooling medium discharged from the fuel cell stack 10.

The power consumption system 50 includes a motor 51 and a current sensor 52.

The motor 51 is supplied with the power generated in the fuel cell stack 10. The motor 51 is rotated by the supplied power and drives the vehicle.

The current sensor 52 detects the value of the current that flows through an operating point that is present between the fuel cell stack 10 and the motor 51.

The ECU 60 is a controller that controls the fuel cell stack 10, the hydrogen system 20, the air system 30, the cooling medium system 40, and the power consumption system 50.

The ECU 60 can be formed of a processor such as a Central Processing Unit (CPU), a memory, and other circuits in hardware, and is achieved by a program or the like loaded to the memory in software. Accordingly, one skilled in the art would understand that the ECU 60 can be achieved by only hardware, only software, or a combination thereof in various forms without any limitation.

Further, the aforementioned program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-Recordable (CD-R), CD-Rewritable (CD-R/W), and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The feature of the present disclosure lies in control of the air system 30, that is, control of the air supply by the air compressor 31. Therefore, in the following description, only the control of the air system 30 will be explained as the control performed by the ECU 60, and control of the fuel cell stack 10, the hydrogen system 20, the cooling medium system 40, and the power consumption system 50 will not be explained.

Figure 2:
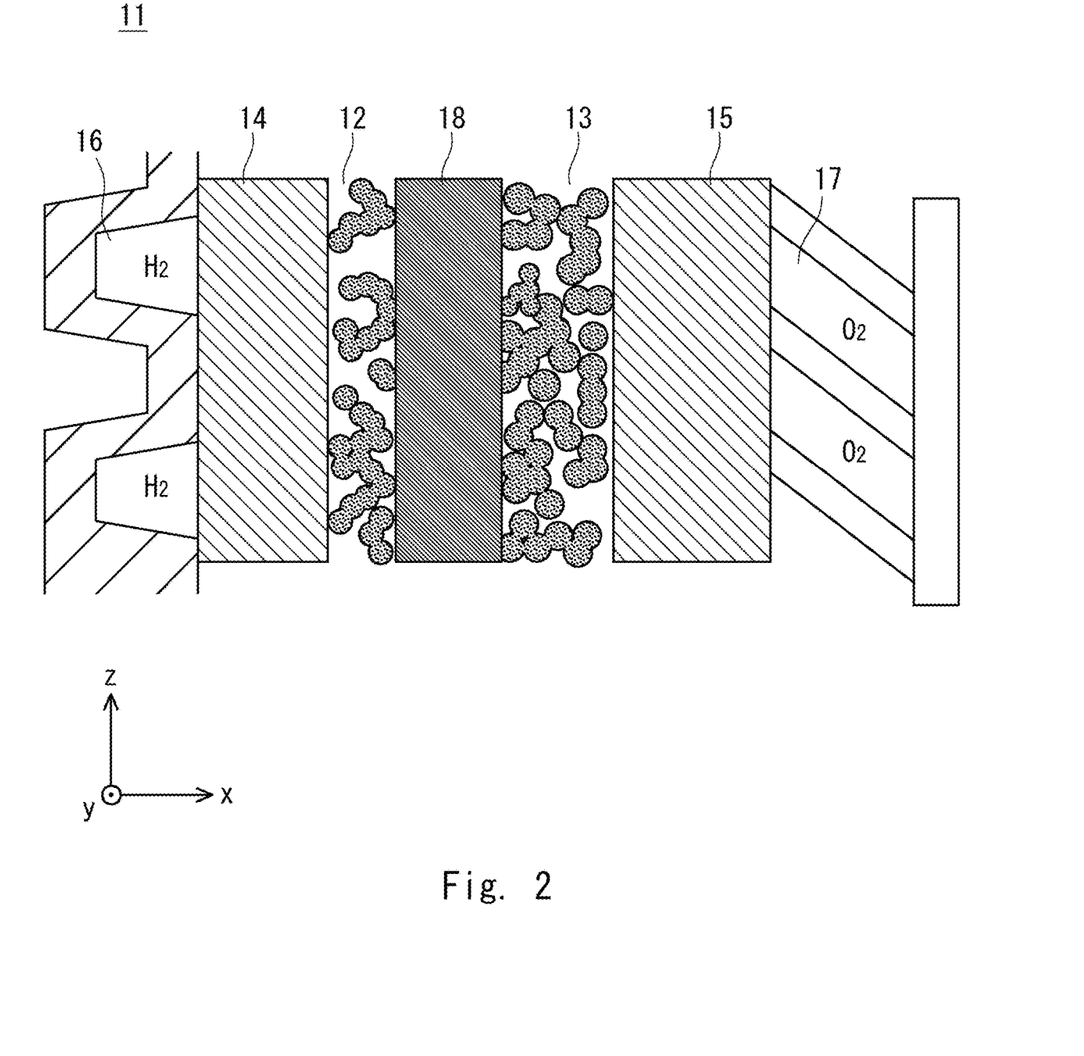
FIG. 2 is a view showing a configuration example of a fuel battery cell according to the first embodiment.

FIG. 2 shows a configuration example of the fuel battery cell 11 that composes the fuel cell stack 10.

With reference to FIG. 2, in the fuel battery cell 11, an anode catalyst layer 12 and an anode gas diffusion layer 14 are stacked in this order on the surface of an electrolyte film 18 on the anode side, and the anode flow path 16 is formed on the outside of the anode gas diffusion layer 14. Further, a cathode catalyst layer 13 and a cathode gas diffusion layer 15 are stacked in this order on the surface of the electrolyte film 18 on the cathode side, and the cathode flow path 17 is formed on the outside of the cathode gas diffusion layer 15.

The hydrogen gas from the hydrogen system 20 passes the anode flow path 16, is diffused in the anode gas diffusion layer 14, and is then supplied to the anode catalyst layer 12. Further, the air from the air system 30 passes the cathode flow path 17, is diffused in the cathode gas diffusion layer 15, and is then supplied to the cathode catalyst layer 13.

The oxidation reaction expressed in Expression (1) occurs in the anode catalyst layer 12, and the reduction reaction expressed in Expression (2) occurs in the cathode catalyst layer 13.

$$H_2 \rightarrow 2H^+ + 2e^- \tag{1}$$

$$\tfrac{1}{2}O_2 + 2H^+ + 2e^- \rightarrow H_2O \tag{2}$$

As a result, in the whole fuel cell stack 10, the power generation reaction expressed in Expression (3) occurs, and water is generated as a reaction product.

$$H_2 + \tfrac{1}{2}O_2 \rightarrow H_2O \tag{3}$$

In the fuel battery cell 11, water, which is the reaction product, overflows from the electrolyte film 18 to the cathode flow path 17 and is retained in the cathode flow path 17, and becomes retained water. If this retained water contacts the electrolyte film 18, the fuel battery cell 11 is degraded, as described above.

In order to solve the aforementioned problem, in the first embodiment, the ECU 60 calculates the amount of water retained in the cathode flow path 17 of the fuel battery cell 11, and when the amount of retained water that has been calculated has become equal to or larger than a retained water threshold, the ECU 60 increases the air flow rate in the cathode flow path 17, and the air blow in the cathode flow path 17 is executed.

The fuel cell stack 10 may be operated in a state in which the air stoichiometric ratio of the air to be supplied to the fuel cell stack 10 is low, that is, smaller than a predetermined value (e.g., the predetermined value is 1.5). In the following description, the operation performed in a state in which the air stoichiometric ratio is equal to or larger than the predetermined value is called a normal operation and the operation performed in a state in which the air stoichiometric ratio is smaller than the predetermined value is called a low air operation.

When the fuel cell stack 10 performs the low air operation, however, a phenomenon in which power generation is locally concentrated in a site of the cell surface of the fuel battery cell 11 and the amount of water retained in this site is locally increased occurs, as described above.

Figure 3:
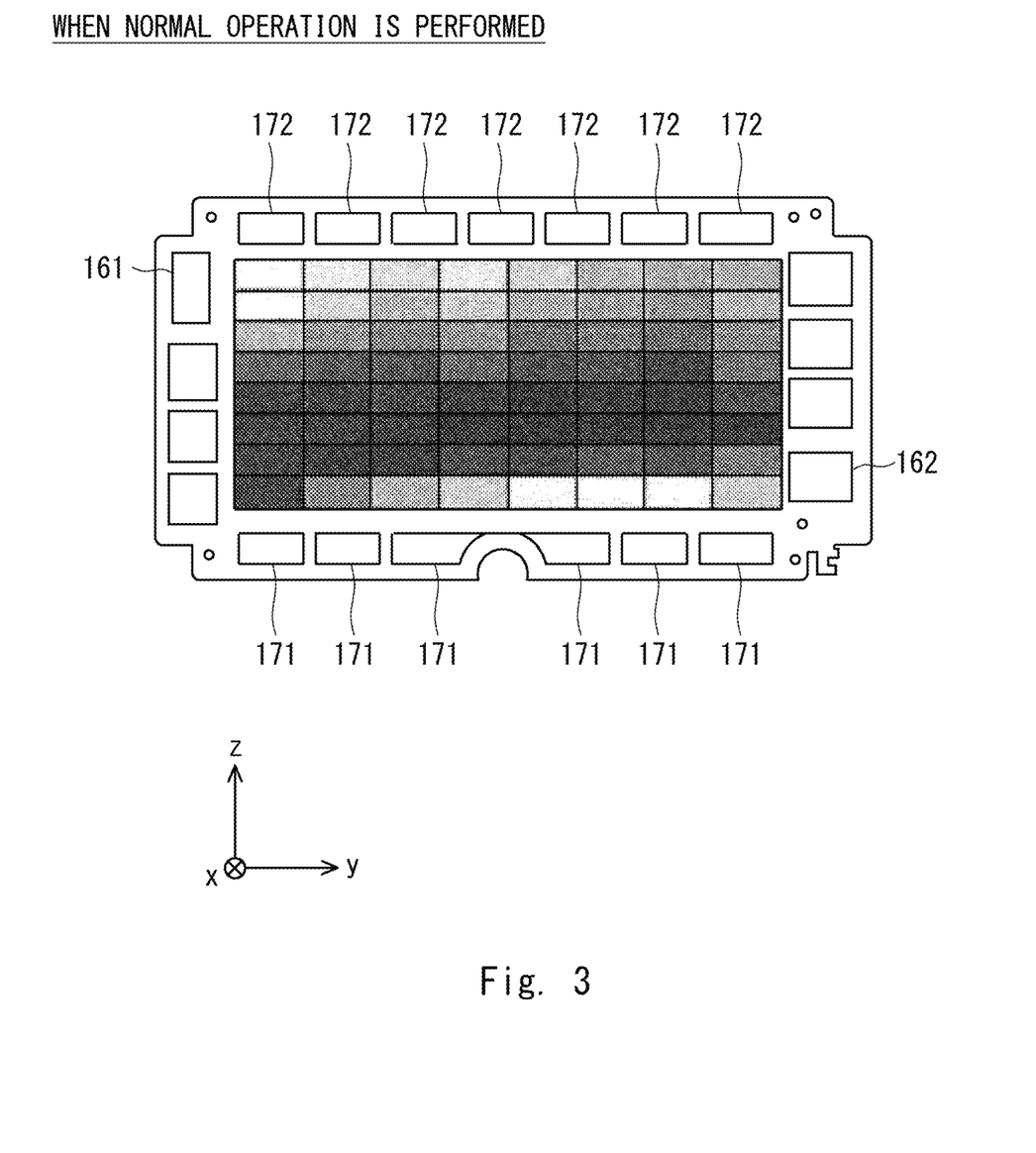
FIG. 3 is a view showing an example of a power generation state in a cell surface of the fuel battery cell when a fuel cell stack performs a normal operation.
Figure 4:
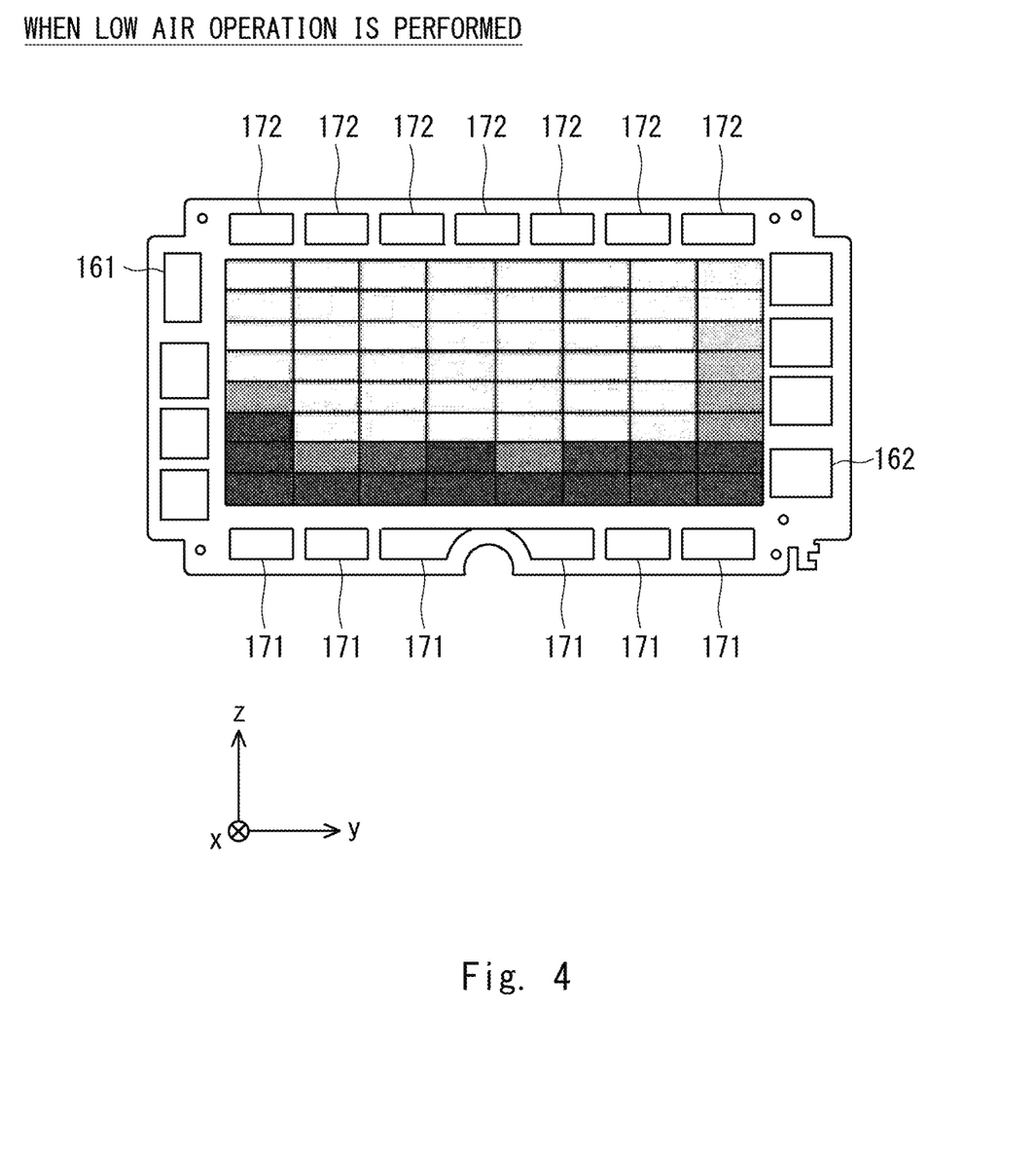
FIG. 4 is a view showing an example of a power generation state in the cell surface of the fuel battery cell when the fuel cell stack performs a low air operation.

FIG. 3 shows an example of the power generation state in the cell surface of the fuel battery cell 11 in the case in which the fuel cell stack 10 performs the normal operation and FIG. 4 shows an example of the power generation state in the cell surface of the fuel battery cell 11 in the case in which the fuel cell stack 10 performs the low air operation. In FIGS. 3 and 4, as the color becomes darker, power generation is more concentrated. Further, in FIGS. 3 and 4, a hydrogen supply port 161 is a part that supplies the hydrogen gas supplied from the hydrogen system 20 to the anode flow path 16 and a hydrogen outlet 162 is a part that discharges the unreacted hydrogen gas discharged from the anode flow path 16 from the fuel battery cell 11. Further, an air supply port 171 is a part that supplies the air supplied from the air system 30 to the cathode flow path 17 and an air outlet 172 is a part that discharges the unreacted air discharged from the cathode flow path 17 from the fuel battery cell 11.

Referring to FIG. 3, it will be understood that in the case in which the fuel cell stack 10 performs the normal operation, the power generation is performed in substantially the whole cell surface of the fuel battery cell 11.

On the other hand, referring to FIG. 4, it will be understood that in the case in which the fuel cell stack 10 performs the low air operation, the power generation is concentrated in a site of the cell surface of the fuel battery cell 11 in the vicinity of the air supply port 171 where the oxygen partial pressure is high (in particular, a site in the lower two lines). Therefore, when the fuel cell stack 10 performs the low air operation, the amount of water retained in the site in the vicinity of the air supply port 171 is locally increased.

However, in the case in which the fuel cell stack 10 performs the low air operation, even when the amount of retained water is locally increased in a site in the vicinity of the air supply port 171, since the amount of retained water on the entire cell surface is small, the air blow in the cathode flow path 17 is not executed, and it is possible that the retained water in the site in the vicinity of the air supply port 171 may contact the electrolyte film 18.

In order to solve the aforementioned problem, in the first embodiment, in the case in which the fuel cell stack 10 performs the low air operation, the ECU 60 calculates the amount of retained water in such a way that the calculated amount includes an extra amount therein in order to enable the air blow to be executed even when the amount of retained water on the entire cell surface is small.

Hereinafter, a method of controlling the fuel cell system according to the first embodiment will be explained.

First, an operation in a case in which the amount of water retained in the cathode flow path 17 of the fuel battery cell 11 is calculated in the fuel cell system according to the first embodiment will be explained.

It is assumed here that the ECU 60 calculates, for each fixed time, the amount of retained water that is retained in the cathode flow path 17 per fixed time as the amount of increase, and integrates the amount of increase that has been calculated, thereby calculating the amount of retained water. It is further assumed that the ECU 60 calculates the amount of increase in the amount of retained water based on the amount of increase in accordance with the current value of the operating point detected in the current sensor 52.

Figure 5:
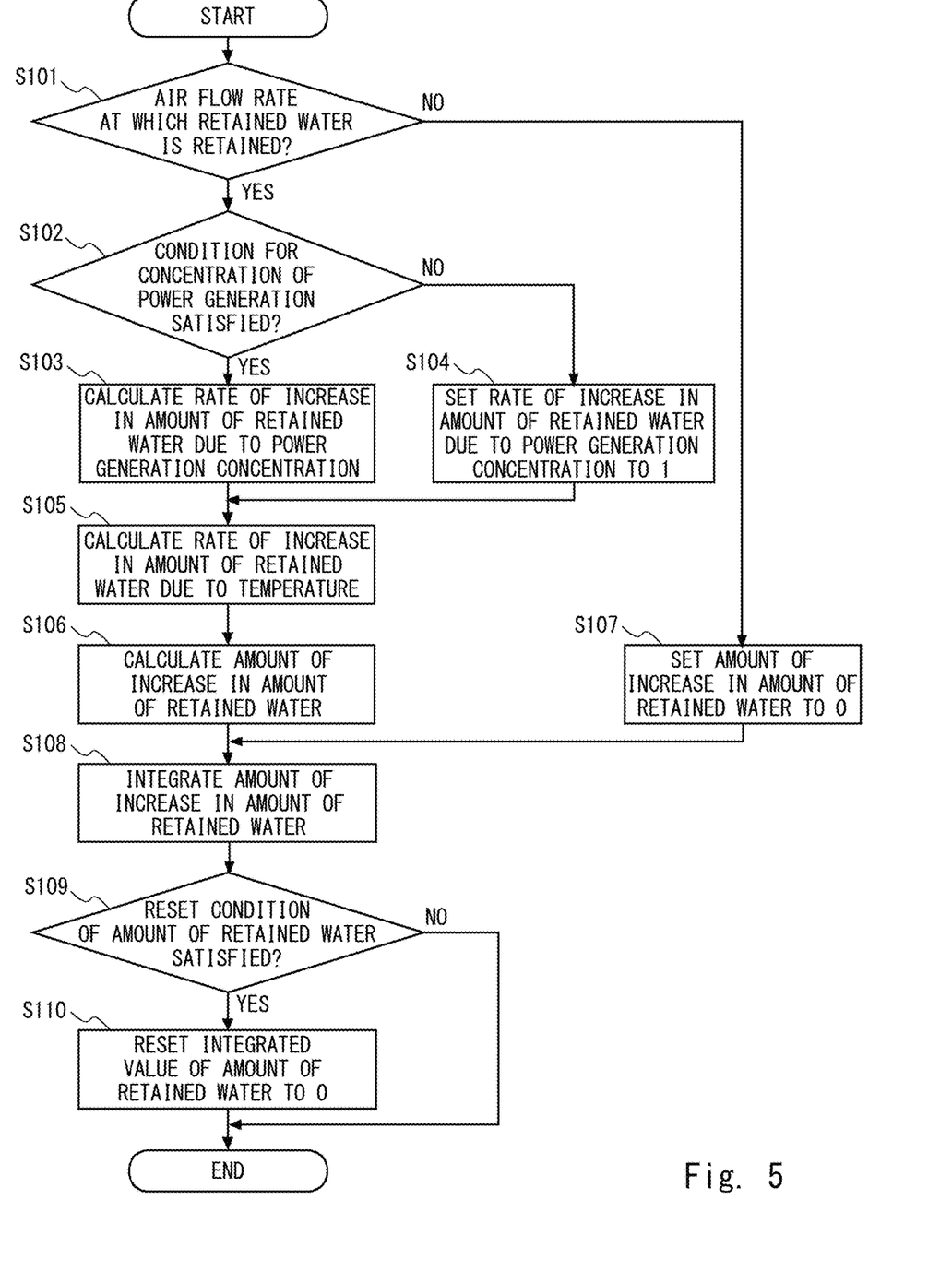
FIG. 5 is a flowchart showing an operational flow example when an amount of water retained in a cathode flow path is calculated in the fuel cell system according to the first embodiment.

FIG. 5 shows an operational flow example of a case in which the amount of water retained in the cathode flow path 17 of the fuel battery cell 11 is calculated in the fuel cell system according to the first embodiment. The operation flow shown in FIG. 5 is executed at regular time intervals.

Referring to FIG. 5, first, the ECU 60 determines whether the present air flow rate of the air that is being supplied from the air system 30 to the cathode flow path 17 is the air flow rate at which the retained water is retained in the cathode flow path 17 (Step S101). In Step S101, when, for example, the present air flow rate is sufficiently high (e.g., the air flow rate is equal to or larger than a flow rate threshold), the retained water can be discharged without retaining it. In this case, the ECU 60 determines that the present air flow rate is not the air flow rate at which the retained water is retained.

When it is determined in Step S101 that the present air flow rate is the air flow rate at which the retained water is retained (YES in Step S101), the ECU 60 then determines whether a condition for concentration of power generation is satisfied (Step S102). When it is determined in Step S102 that the present air stoichiometric ratio is smaller than a predetermined value (i.e., in the case of the low air operation), for example, the ECU 60 determines that the condition for the concentration of power generation is satisfied. When the present air stoichiometric ratio is equal to or larger than the predetermined value (i.e., in the case of the normal operation), the ECU 60 determines that the condition for the concentration of power generation is not satisfied.

When it is determined in Step S102 that the condition for the concentration of power generation is satisfied (YES in Step S102), the ECU 60 calculates the rate of increase in the amount of retained water in accordance with the degree of the power generation concentration (Step S103). The rate of increase in the amount of retained water calculated in Step S103 becomes a value larger than "1".

Figure 6:
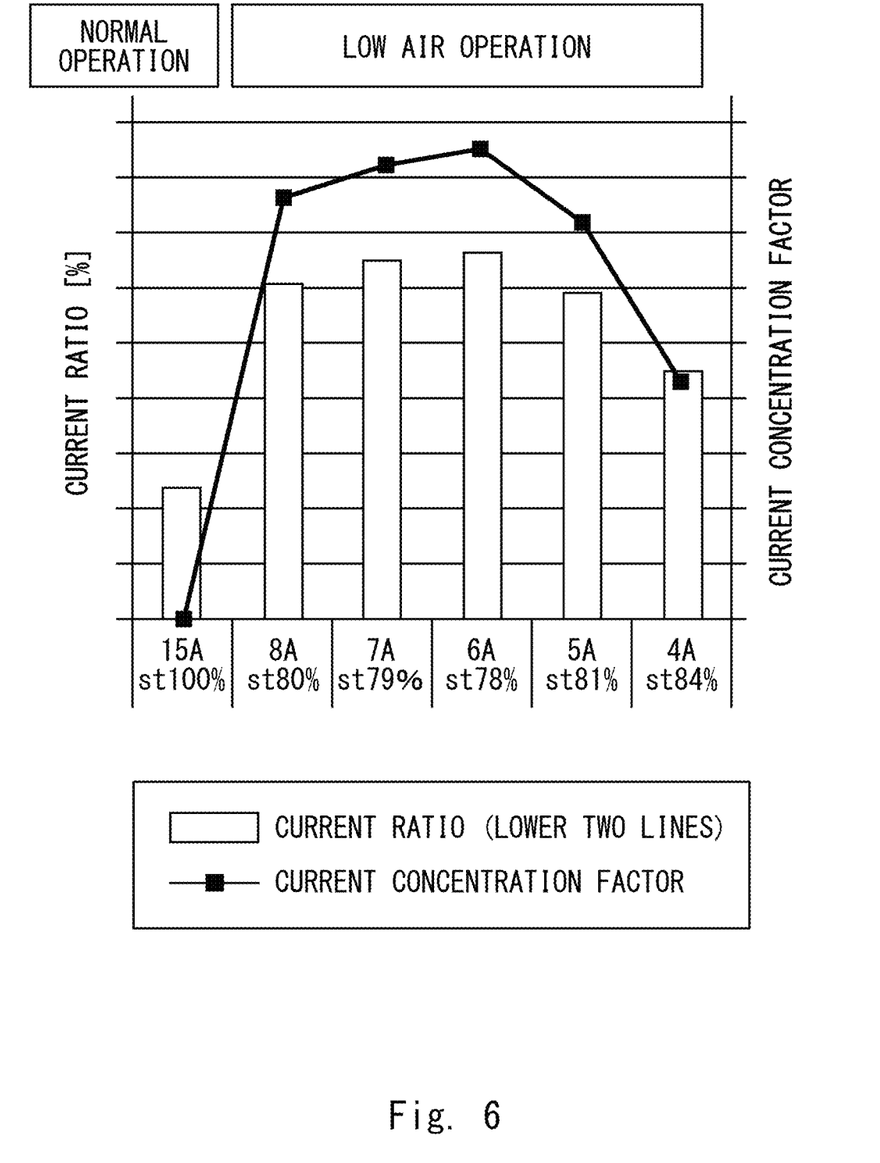
FIG. 6 is a view showing an example of a map indicating a current ratio and a current concentration factor for each combination of a current value of an operating point and an air stoichiometric ratio in the fuel cell system according to the first embodiment.

FIG. 6 shows an example of a map indicating the current ratio and the current concentration factor for each combination of the current value (A) of the operating point and the air stoichiometric ratio (ST) in the fuel cell system according to the first embodiment. In FIG. 6, the air stoichiometric ratio when the low air operation is performed is indicated by % based on the air stoichiometric ratio when the normal operation is performed, which is shown by 100%.

The ECU 60 holds the map as shown in FIG. 6. The current ratio is a ratio of the current that flows through a site in the lower two lines on the cell surface (see FIG. 4) to the total current that flows through the whole cell surface of the fuel battery cell 11. The current concentration factor is a factor that indicates the current ratio by a relative value based on the current ratio when the normal operation is performed.

In Step S103, the ECU 60 selects the current concentration factor in accordance with the combination of the current value at the present operating point detected by the current sensor 52 and the present air stoichiometric ratio, and sets the rate of increase in the amount of retained water to a value in accordance with the current concentration factor that has been selected.

Referring back to FIG. 5, when it is determined in Step S102 that the condition for the concentration of power generation is not satisfied (No in Step S102), the ECU 60 sets the rate of increase in the amount of retained water to "1" (Step S104).

Next, the ECU 60 calculates the rate of increase in the amount of retained water in accordance with the present temperature of the fuel cell stack 10 (Step S105). In Step S105, the ECU 60 determines the temperature of the fuel cell stack 10 based on the water temperature detected in the water temperature sensor 43. The rate of increase in the amount of retained water calculated in Step S105 becomes a value equal to or smaller than "1".

Next, the ECU 60 calculates the amount of increase in the amount of retained water (Step S106). In Step S106, first, the ECU 60 calculates the base value of the amount of increase in the amount of retained water in accordance with the current value at the present operating point detected in the current sensor 52. Next, the ECU 60 multiplies, for this base value, the rate of increase in the amount of retained water calculated or set in Step S103 or S104 by the rate of increase in the amount of retained water calculated in Step S105. Then the ECU 60 sets this result of the multiplication to be the amount of increase in the amount of retained water.

On the other hand, when it is determined in Step S101 that the present air flow rate is not the air flow rate at which the retained water is retained (NO in Step S101), the ECU 60 sets the amount of increase in the amount of retained water to "0" [g/cell] (Step S107).

Next, the ECU 60 further integrates the amount of increase in the amount of retained water with the integrated value of the present amount of retained water (Step S108). Accordingly, the integrated value of the present amount of retained water is updated to the result of the integration in Step S108. The amount of increase in the amount of retained water integrated here is the amount of increase that has been calculated in Step S106 or the amount of increase set to "0" in Step S107.

Next, the ECU 60 determines whether a reset condition for resetting the amount of retained water is satisfied (Step S109). In Step S109, when the amount of retained water has become equal to or larger than the retained water threshold and the air blow has been executed or when the total air flow rate when the air is supplied at the air flow rate at which it has been determined to be NO in Step S101 has become equal to or larger than the total flow rate threshold, the ECU 60 determines that the condition for resetting the amount of retained water is satisfied.

When it is determined in Step S109 that the condition for resetting the amount of retained water is satisfied (YES in Step S109), the ECU 60 resets the integrated value of the present amount of retained water to "0" [g/cell] (Step S110).

On the other hand, when it is determined in Step S109 that the condition for resetting the amount of retained water is not satisfied (NO in Step S109), the ECU 60 does not reset the integrated value of the present amount of retained water and leaves as it is.

The operation flow now ends. When the operation flow in FIG. 5 is executed next time, the amount of increase in the amount of retained water obtained next time is further integrated with the integrated value of the amount of retained water at the timing when the operation flow is ended this time.

Next, in the fuel cell system according to the first embodiment, operations when the air blow in the cathode flow path 17 of the fuel battery cell 11 is executed will be explained.

Figure 7:
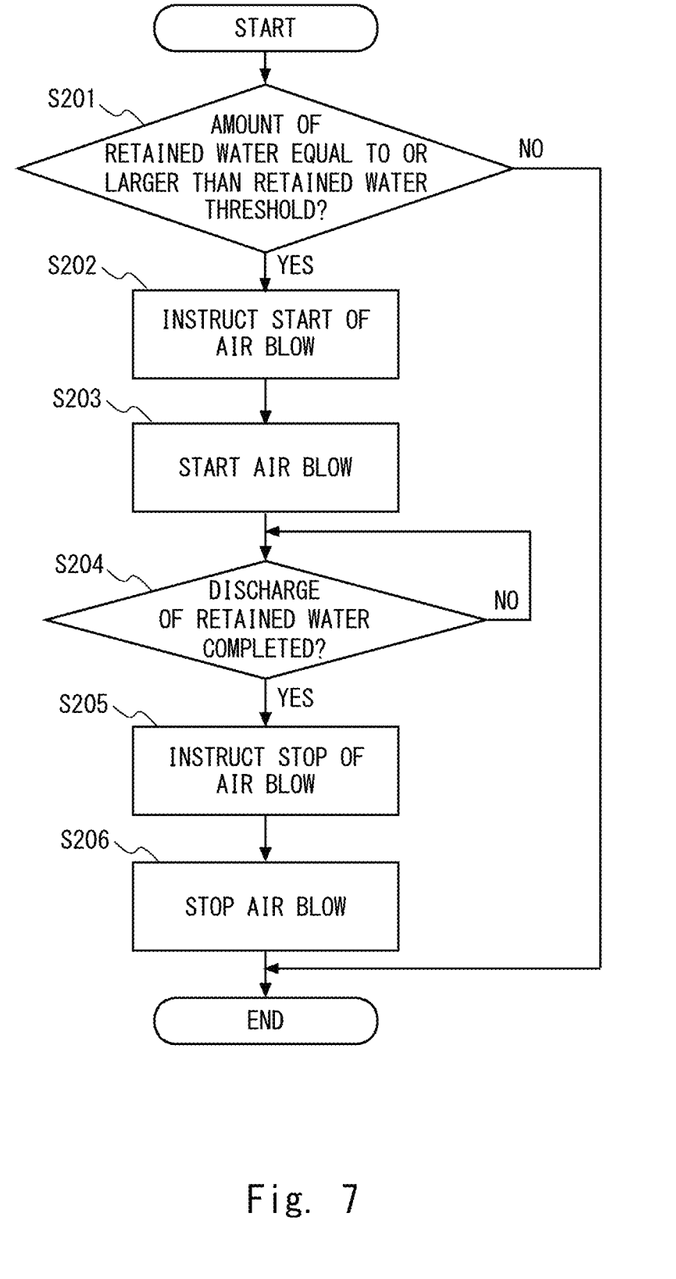
FIG. 7 is a flowchart showing an operational flow example when an air blow in a cathode flow path is executed in the fuel cell system according to the first embodiment.

FIG. 7 shows an operational flow example when the air blow in the cathode flow path 17 of the fuel battery cell 11 is executed in the fuel cell system according to the first embodiment. The timing when the operation flow shown in FIG. 7 is executed is equal to, for example, a timing after Step S108 in FIG. 5 is ended.

Referring to FIG. 7, first, the ECU 60 determines whether the integrated value of the present amount of retained water is equal to or larger than the retained water threshold (Step S201).

When it is determined in Step S201 that the integrated value of the amount of retained water is equal to or larger than the retained water threshold (YES in Step S201), the ECU 60 instructs the air compressor 31 to start the air blow in the cathode flow path 17 (Step S202). In this case, the ECU 60 also sends an instruction regarding the air flow rate and the time when the air blow is executed to the air compressor 31. In the first embodiment, it is assumed that the air flow rate and the time when the air blow is executed are predetermined. Upon receiving the instruction from the ECU 60, the air compressor 31 starts the air blow in the cathode flow path 17 (Step S203).

During the execution of the air blow, the ECU 60 determines whether the discharge of the retained water from the cathode flow path 17 has been completed (Step S204).

When it is determined in Step S204 that the discharge of the retained water has been completed (YES in Step S204), the ECU 60 instructs the air compressor 31 to stop the air blow in the cathode flow path 17 (Step S205). Upon receiving the instruction from the ECU 60, the air compressor 31 stops the air blow in the cathode flow path 17 (Step S206).

As described above, according to the first embodiment, the ECU 60 calculates the amount of water retained in the cathode flow path 17 in such a way that the calculated amount includes an extra amount therein in the case in which the fuel cell stack 10 performs the low air operation.

Therefore, in the case in which the fuel cell stack 10 performs the low air operation, even when the amount of retained water on the entire cell surface is small, the air blow in the cathode flow path 17 can be executed.

Accordingly, even under a condition in which the fuel cell stack 10 performs the low air operation, that is, a condition in which the local increase in the amount of retained water occurs in the cell surface of the fuel battery cell 11, it is possible to appropriately execute the air blow and suppress the degradation of the fuel battery cell 11.

(2) Second Embodiment

In the first embodiment, regardless of whether the fuel cell stack 10 performs the normal operation or the low air operation, the air flow rate and the time when the air blow is executed are predetermined and fixed.

On the other hand, in a second embodiment, the air flow rate and the time when the air blow is executed are determined depending on whether the fuel cell stack 10 performs the normal operation or the low air operation.

The configuration itself in the second embodiment is similar to that in the first embodiment. Regarding the operations therein, only the operations when the air blow in the cathode flow path 17 of the fuel battery cell 11 is executed are different from those in the first embodiment.

Therefore, in the following description, the description of the configuration in the second embodiment is omitted, and only the operation when the air blow in the cathode flow path 17 of the fuel battery cell 11 is executed will be explained as the operations of the second embodiment.

Figure 8:
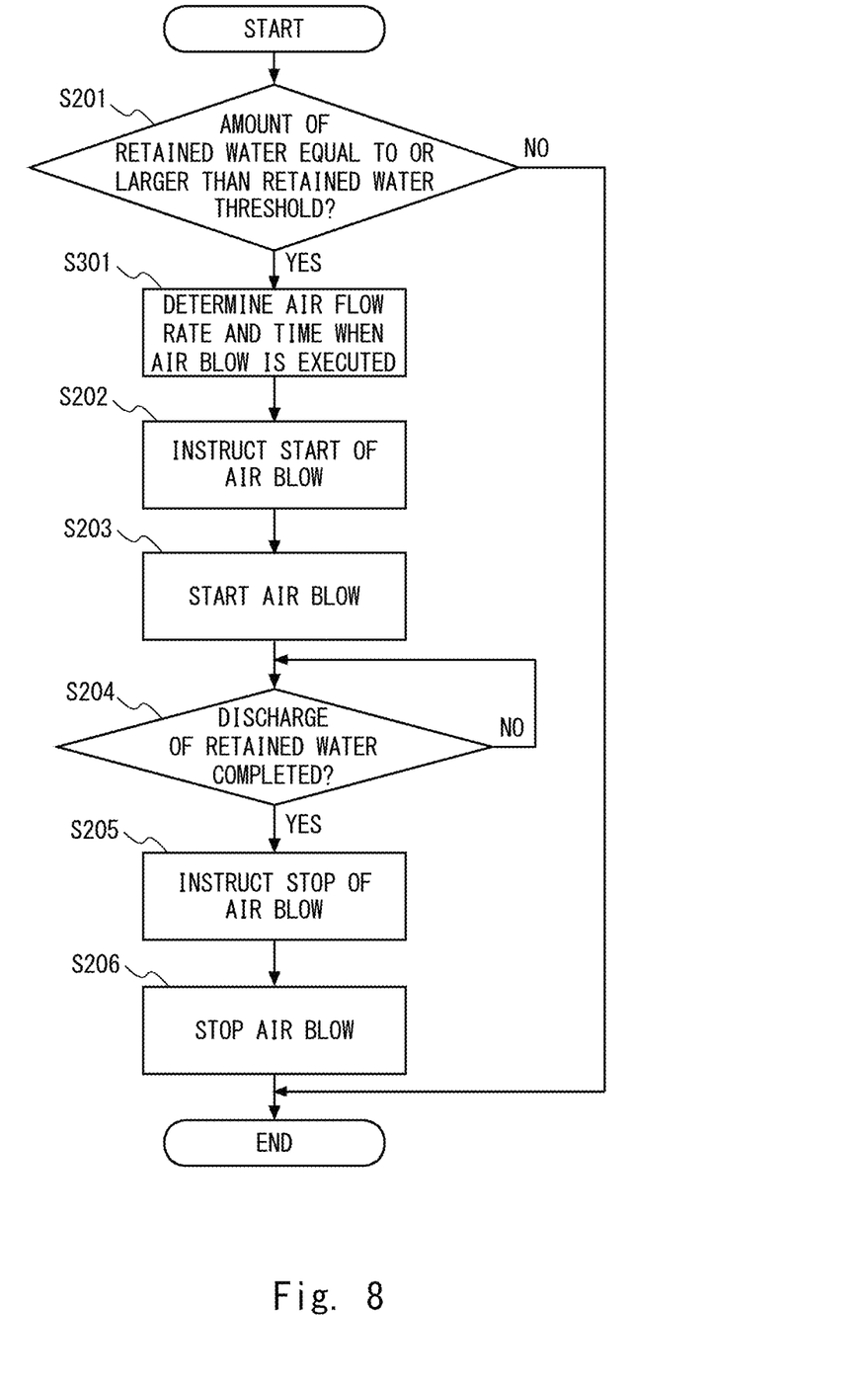
FIG. 8 is a flowchart showing an operational flow example when an air blow in a cathode flow path is executed in a fuel cell system according to a second embodiment.

FIG. 8 shows an operational flow example when the air blow in the cathode flow path 17 of the fuel battery cell 11 is executed in the fuel cell system according to the second embodiment.

The operation flow shown in FIG. 8 is different from the operation flow shown in FIG. 7 in that Step S301 is performed before Step S202 when the result of the determination in Step S201 is YES.

In Step S301, the ECU 60 determines the air flow rate and the time when the air blow is executed depending on whether the fuel cell stack 10 performs the normal operation or the low air operation.

For example, in Step S301, the ECU 60 determines whether the fuel cell stack 10 performs the normal operation or the low air operation. When the fuel cell stack 10 performs the low air operation, the ECU 60 increases the discharge strength of the retained water by, for example, increasing the air flow rate when the air blow is executed or increasing the time during which the air blow is executed compared to the case in which the fuel cell stack 10 performs the normal operation.

In the next step S202, the ECU 60 sends an instruction regarding the air flow rate and the time when the air blow is executed determined in Step S301 to the air compressor 31 along with the instruction for starting the air blow in the cathode flow path 17.

Since the operation flow other than that stated above is similar to the operation flow shown in FIG. 7, the descriptions thereof will be omitted.

As described above, according to the second embodiment, in the case in which the fuel cell stack 10 performs the low air operation, the ECU 60 increases the discharge strength of the retained water by, for example, increasing the air flow rate when the air blow in the cathode flow path 17 is executed or increasing the time during which the air blow is executed compared to the case in which the fuel cell stack 10 performs the normal operation.

Therefore, in the case in which the fuel cell stack 10 performs the low air operation, the water retained in the cathode flow path 17 can be discharged without leaving it in the cathode flow path 17.

Accordingly, this embodiment may contribute to the appropriate execution of the air blow under a condition in which the fuel cell stack 10 performs the low air operation, that is, a condition in which the local increase in the amount of retained water occurs in the cell surface of the fuel battery cell 11, whereby it is possible to further suppress the degradation of the fuel battery cell 11.

The present disclosure is not limited to the aforementioned embodiments and may be changed as appropriate without departing from the spirit of the present disclosure.

The cell surface of the fuel battery cell 11 may be, for example, subjected to in-plane division, and the current value may be detected for each divisional site, whereby the amount of retained water may be calculated.

The detection of the current value for each divisional site can be performed using the current sensor that has been subjected to the in-plane division.

Alternatively, a current concentration map (a map indicating the ratio of the current of each divisional site to the total current on the entire cell surface) in accordance with the air stoichiometric ratio may be experimentally obtained in advance, and the total current value detected by the current sensor may be multiplied by the value of the current concentration map, whereby the current value for each divisional site may be detected.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A fuel cell system comprising:
   a fuel cell stack formed of a plurality of stacked fuel battery cells;
   an air supply apparatus configured to supply air to a cathode flow path of the fuel battery cell; and
   a controller configured to control supply of the air by the air supply apparatus, wherein
   when the fuel cell stack is operated in a state in which an air stoichiometric ratio of the air to be supplied to the cathode flow path of the fuel battery cell is equal to or larger than a predetermined value, the controller calculates an amount of retained water that has been retained in the cathode flow path of the fuel battery cell per fixed time, integrates the amount of retained water per fixed time that has been calculated, and executes air blow in the cathode flow path of the fuel battery cell when the integrated value of the amount of retained water becomes equal to or larger than a threshold, and
   when the fuel cell stack is operated in a state in which the air stoichiometric ratio is smaller than the predetermined value, the controller calculates the amount of retained water that has been retained in the cathode flow path of the fuel battery cell per fixed time in such a way that the calculated amount includes an extra amount therein, integrates the amount of retained water per fixed time that has been calculated in such a way that the calculated amount includes the extra amount therein, and executes air blow in the cathode flow path of the fuel battery cell when the integrated value of the amount of retained water becomes equal to or larger than the threshold.

2. The fuel cell system according to claim 1, wherein
   in the case when the fuel cell stack is operated in the state in which the air stoichiometric ratio is smaller than the predetermined value, the controller increases the air flow rate when the air blow in the cathode flow path of the fuel battery cell is executed compared to the case in which the fuel cell stack is operated in the state in which the air stoichiometric ratio is equal to or larger than the predetermined value.

3. The fuel cell system according to claim 1, wherein
   in the case when the fuel cell stack is operated in the state in which the air stoichiometric ratio is smaller than the predetermined value, the controller increases a time during which the air blow in the cathode flow path of the fuel battery cell is executed compared to the case in which the fuel cell stack is operated in the state in which the air stoichiometric ratio is equal to or larger than the predetermined value.

4. A method of controlling a fuel cell system comprising a fuel cell stack formed of a plurality of stacked fuel battery cells, wherein
   when the fuel cell stack is operated in a state in which an air stoichiometric ratio of air to be supplied to a cathode flow path of the fuel battery cell is equal to or larger than a predetermined value, an amount of retained water that has been retained in the cathode flow path of the fuel battery cell per fixed time is calculated, the amount of retained water per fixed time that has been calculated is integrated, and air blow in the cathode flow path of the fuel battery cell is executed when the integrated value of the amount of retained water becomes equal to or larger than a threshold, and
   when the fuel cell stack is operated in a state in which the air stoichiometric ratio is smaller than the predetermined value, the amount of retained water that has been retained in the cathode flow path of the fuel battery cell per fixed time is calculated in such a way that the calculated amount includes an extra amount therein, the amount of retained water per fixed time that has been calculated in such a way that the calculated amount includes the extra amount therein is integrated, and air blow in the cathode flow path of the fuel battery cell is executed when the integrated value of the amount of retained water becomes equal to or larger than the threshold.

* * * * *